(12) United States Patent
Garg (10) Patent No.: US 9,195,729 B2
(45) Date of Patent: *Nov. 24, 2015

(54) EFFICIENT LOADING OF DATA IN DATABASES

(75) Inventor: Kartika Garg, Haryana (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,933

(22) Filed: Feb. 27, 2012

(65) Prior Publication Data

US 2013/0185251 A1    Jul. 18, 2013

Related U.S. Application Data

(63) Continuation of application No. 13/351,819, filed on Jan. 17, 2012, now Pat. No. 8,965,838.

(51) Int. Cl.
*G06F 17/30* (2006.01)
(52) U.S. Cl.
CPC .... *G06F 17/30592* (2013.01); *G06F 17/30917* (2013.01)
(58) Field of Classification Search
CPC ............. G06F 17/30595; G06F 17/30545; G06F 17/30445; G06F 17/30592
USPC ............... 707/600, 601, 602, 999.1, 999.101
See application file for complete search history.

(56) References Cited

U.S. PATENT DOCUMENTS

| | | | | |
|---|---|---|---|---|
| 6,560,647 B1 * | 5/2003 | Hafez et al. | ............ | 709/224 |
| 7,020,656 B1 | 3/2006 | Gong | | |
| 7,555,493 B2 * | 6/2009 | Khayter et al. | ............ | 1/1 |
| 7,904,468 B2 * | 3/2011 | Neil et al. | ............ | 707/763 |
| 8,065,323 B2 * | 11/2011 | Sallakonda et al. | ............ | 707/769 |
| 8,131,799 B2 * | 3/2012 | Landsman et al. | ............ | 709/203 |
| 2005/0049996 A1 * | 3/2005 | Srinivasan et al. | ............ | 707/1 |
| 2007/0094261 A1 | 4/2007 | Phelan et al. | | |
| 2007/0219653 A1 * | 9/2007 | Martin | ............ | 700/90 |
| 2008/0091743 A1 * | 4/2008 | Goff | ............ | 707/203 |
| 2009/0187582 A1 | 7/2009 | Chen et al. | | |
| 2010/0198778 A1 | 8/2010 | Venugopal et al. | | |
| 2010/0205141 A1 * | 8/2010 | Meesa | ............ | 707/602 |
| 2010/0211539 A1 | 8/2010 | Ho | | |
| 2010/0250566 A1 * | 9/2010 | Paul | ............ | 707/756 |
| 2010/0306656 A1 * | 12/2010 | Moloney et al. | ............ | 715/723 |
| 2011/0060719 A1 * | 3/2011 | Kapoor | ............ | 707/602 |

OTHER PUBLICATIONS

"Abstract—Bulk Loading a Data Warehouse Built upon a UB-Tree", http://www.computer.org/portal/web/csdl/doi/10.1109/IDEAS. 2000.880576, 1 page, Sep. 2000.
Bourret et al., "A Generic Load/Extract Utility for Data Transfer Between XML Documents and Relational Databases", Technical Report DVS99-1, Department of Computer Science, Darmstadt University of Technology, Dec. 15, 1999, pp. 1-22.

* cited by examiner

*Primary Examiner* — MD. I Uddin
(74) *Attorney, Agent, or Firm* — Susan Murray; Edell, Shapiro & Finnan, LLC (57) ABSTRACT

A computer implemented method, system and computer program product for managing data in databases generates a control file for a database by utilizing a definition file associated with the database and predefined column definitions, organizes data within a data file in a predefined format, wherein the data is desirable to be loaded in the database, and loads the data from the data file to the database by utilizing the control file and the data file.

20 Claims, 4 Drawing Sheets

EFFICIENT LOADING OF DATA IN DATABASES

CROSS-REFERENCE TO RELATED APPLICATIONS

This application is a continuation of U.S. patent application Ser. No. 13/351,819, entitled "Efficient Loading of Data in Databases" and filed Jan. 17, 2012, the disclosure of which is incorporated herein by reference in its entirety.

FIELD OF THE INVENTION

Embodiments of the present invention relates to efficient loading of data in databases.

BACKGROUND OF THE INVENTION

A data warehouse is a database that is generally designed to support decision-making, querying, reporting and analysis. The data warehouse includes data that is populated from various data sources and servers associated with different data models. Examples of a data model include Enterprise Resource Planning solutions (ERP), Customer Relationship Management (CRM) solutions, and the like.

As the data warehouse is associated with various data sources it includes large amount of data and the data may be of different types and different formats. Thus, a large number of transactions is required by individuals to load the data from different sources to the data warehouse. To load the data in the data warehouse, the data should be first extracted form various sources and then it should be loaded into the data warehouse in a predefined format. Today, the process of loading data from the different sources to the data warehouse is automated using "Extract, Transform, and Load" (ETL) methodology or Extract, Load and Transform (ELT) methodology. The ETL methodology is used to correlate the data prior to loading the data into the data warehouse.

The ETL process first defines a data flow that includes data transformation activities for extracting data from different sources, for example flat files or relational tables. Thereafter, the process transforms the data; hence transformation refers to the processing of the data to put it into a more useful form or format acceptable by the data warehouse. The process then loads the data into a database, data warehouse, data mart, or staging table. Hence, loading in the ETL process refers to the loading of data into the tables of a relational database included in the data warehouse. However, in the ELT methodology, the data is first extracted, as it is done in the ETL methodology, and then the data is loaded in the database, data warehouse, data mart, or staging table. Thereafter, the transformation rules are applied on the loaded data. Therefore, in both methodologies, ETL and ELT, loading is an important aspect.

Today, different approaches may be used to store and load data into a database. According to one approach, a client application parses data and thereafter loads the data into databases. Generally, the client application generates Structured Query Language (SQL) commands, for example a SELECT command, an UPDATE command, an INSERT command, or the like, for loading and modifying the data. The commands are executed by a database server and enable the loading of data into corresponding columns of a database table in the database.

In another approach, data is stored directly into a database without going through a SQL engine. This is done using various database software modules, generally known as database stages. The database stages may include control files for loading data. A client application can determine the types of the data using the database stages. The client application then creates an array of data corresponding to columns of a table in a relational database. Thereafter, the client application can populate the array with the data that is to be loaded in the corresponding column. Further, the client application converts the array into a stream of data, which the database server can directly convert into the database's data blocks. In the above method, the ETL process has several database stages to handle loading of data into data warehouse. These employ native database provided tools to load data into the warehouse. Thus, a separate database stage is required for loading data into different databases.

Hence, there exists a need to efficiently manage loading of data into the databases.

BRIEF SUMMARY OF THE INVENTION

According to embodiments of the present invention, a computer implemented method, system and computer program product for managing data in databases generates a control file for a database by utilizing a definition file associated with the database and predefined column definitions, organizes data within a data file in a predefined format, wherein the data is desirable to be loaded in the database and loads the data from the data file to the database by utilizing the control file and the data file.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION OF THE INVENTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

The illustrated embodiments of the invention will be best understood by reference to the figures. The following description is intended only by way of example and simply illustrates certain selected exemplary embodiments of the invention as claimed herein.

FIG. 1 through 4, as discussed below, and the various embodiments used to describe the principles of the invention are by way of illustration only and should not be construed in any way to limit the scope of the disclosure. Those skilled in the art will understand that the principles of the invention may be implemented in any suitably arranged system. The terms used to describe various embodiments are exemplary. It should be understood that these are provided to merely aid the understanding of the description, and that their use and definitions in no way limit the scope of the invention. Further, terms such as "first", "second", etc., are used to differentiate between objects having the same terminology and are not intended to represent a chronological order, except where stated otherwise. A set is defined as a non-empty set including at least one element.

Figure 1:
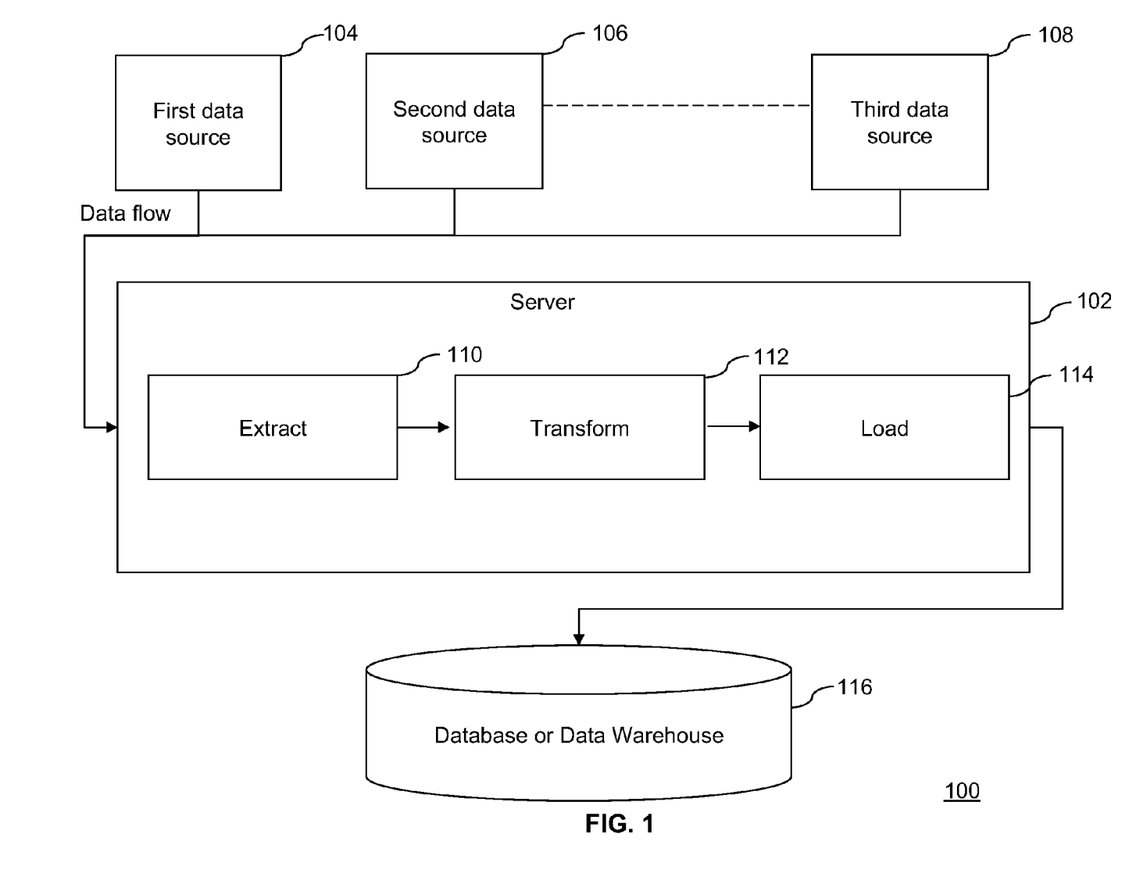
FIG. 1 illustrates an exemplary environment in which various embodiments of the invention may be practiced.

Referring to FIG. 1, an environment 100 is shown. The environment 100 illustrates an Extract, Transform, and Load (ETL) system. The ETL system 100 includes a server 102 that includes an extract phase, a transform phase, and a load phase to integrate data from different data sources, for example, a first data source 104, a second data source 106, and a third data source 108, and then load the data. Though only three data sources are shown for illustrative purposes, a person skilled in the art will appreciate that many such sources can be present as data sources. The data sources may be different from each other and may include data in different formats. Examples of data sources include flat files, relational databases, non-relational database structures, and the like. Thus, the first data source 104 can be a relational database, the second data source 106 can be a flat file, and a third data source 108 can be an Information Management System (IMS).

The extract phase 110 extracts data from the different data sources associated with the ETL system, for example the first data source 104, the second data source 106, and the third data source 108. The extract phase 110 includes converting the data that is fetched from different data sources into a format for transformation processing. The transform phase 112 applies a series of rules or functions to the extracted data and then the data is prepared to be forwarded for loading. The load phase 114 loads the data into a database or a data warehouse, for example a database 116 using a single stage that is driven through an Extensible (or, Extended) Markup Language (XML) configuration file. The single stage supports loading of data into any database or data warehouses.

In the environment 100, the single stage created can read and interpret the XML definition file and use a column definition entered in the graphical user interface (GUI) of a system such as the IBM® InfoSphere® information server data integration platform to create the control file for comma separated data or delimited data according to the database control file syntax. (IBM and InfoSphere are trademarks of international Business Machines Corporation, registered in many jurisdictions worldwide.) In an embodiment, XML definition file for each database and Information Server GUI is predefined in the server 102. The dynamically generated control file and a data file are then used to load data in the database 116. In an embodiment, the data file is a flat file or First In/First Out (FIFO) file including delimited data or a Comma Separated Version (CSV) data.

Figure 2:
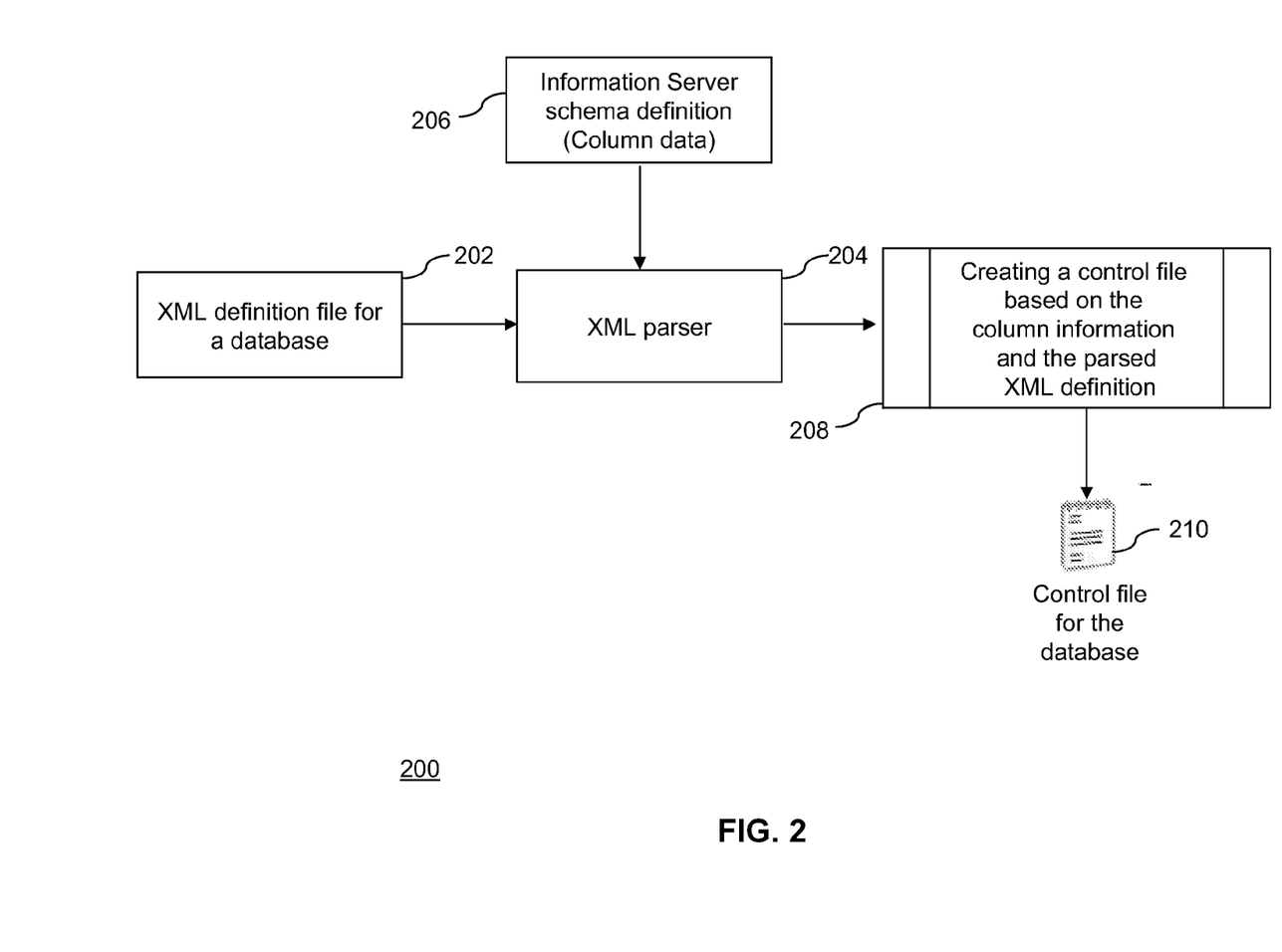
FIG. 2 illustrates a flow diagram to create a control file, in accordance with an embodiment of the invention.

Referring to FIG. 2, a flow diagram 200 for creating a control file is shown. In the ETL process, a control file 210 is created for loading data in databases dynamically. In an embodiment, the control file is created by a software module, known as a database stage. An XML file 202 and the Information Server GUI are used to create the control file 210.

In an embodiment, an XML file for each database is stored in the server, for example the server 102. In an embodiment, the XML file abstracts control file syntax for a database into XML format. The XML file 202 includes data type definitions of the associated database. Prior to loading, the XML file 202 is parsed by an XML parser 204 to identify attributes, for example database name, table name, operation to be performed, keywords and criteria to be followed for creating the control file 210.

For sake of clarity and purpose of this description, an exemplary XML definition file for an Oracle database is shown below for reference. (Oracle is a trademark of Oracle Corporation.)(Oracle is a trademark of Oracle Corporation.)

```
<ControlFile>
    <Keyword>load data</Keyword>
    <Keyword>infile</Keyword>
    <Option attribute="substitute">ORCH.datafile</Option>
    <Keyword>into table</Keyword>
    <Option attribute="substitute">ORCH.table></Option>
    <Keyword>fields terminated by ","</Keyword>
    <Keyword>optionally enclosed by ""</Keyword>
    <Keyword>(</Keyword>
    <List>
    <Column attribute="describe">
        <Name/>
        <Type>OracleOrchMapping</Type>
        <Nullability attribute="generate">
            <Keyword>NULLIF (</Keyword>
            <Name/>
            <Keyword>="NULL")</Keyword>
        </Nullability>
    </Column>
    </List>
    <Keyword>)</Keyword>
</ControlFile>
```

The definitions included in the XML file, for example in the above exemplary file, are parsed by the parser 204. Thus, the XML file is parsed and fields like table name and data file name are substituted to create a valid control file at runtime. Thereafter, the column definitions are extracted from the Information Server schema definitions 206. In an embodiment, the Information Server column data definitions 206 are in Advanced Packaging Tool (APT) schema class and are arranged like a record. An example of the extracted column definition is COL1: nullable string[10]; COL2: string [max=15]; COL3:string[15]; COL4:string[20];.

At 208, the control file 210 is created using the parsed XML file 204 and columns definitions 206 of the database table. Hence, the control file 210 is created by first parsing the XML definition file and then identifying a column meta-tag in the XML definition file. The column meta-tag provides the syntax for the column definition required for the control file as shown below.

```
<List>
    <Column attribute="describe">
        <Name/>
        <Type>OracleOrchMapping</Type>
        <Nullability attribute="generate">
            <Keyword>NULLIF (</Keyword>
            <Name/>
            <Keyword>="NULL")</Keyword>
        </Nullability>
    </Column>
</List>
```

Thereafter, the identified column meta-tag is simultaneously replaced with the column definition extracted from the Information Server schema definitions and interpreted according to XML definition. In an example, the control file created using the above exemplary XML definition file and the Information Server column data definition (COL1: nullable string[10]; COL2: string[max=15]; COL3:string[15]; COL4:string[20];) is given below.

COL1 CHAR NULLIF (COL1="NULL"),
COL2 CHAR,
COL3 CHAR,
COL4 CHAR

Exemplary pseudo code for creating a control file by utilizing the XML definition file and the Information Server column data is given below. The pseudo code below is solely for the purpose of clarity and understanding and in no way limits the scope of the invention.

Pseudo-Code:

```
Start parsing XML definition file;
While XML definition file has tags
do {
if meta-tag == keyword
    write attribute value to control file;
if meta-tag == option
    lookup attribute value in Information Server user parameters and
include that in the control file;
if meta-tag == list
    start preparing column definition in the control file till the file
    reaches the tag
'</List>';
}
End
```

In an embodiment, user inputs may also be received at runtime for creation of a control file. For example, values and definitions of a column can be provided by the user at run time. Thus, the control file 210 is then created utilizing the user inputs, parsed XML definition file and the predefined column definitions.

Thus, a dynamically created control file for an Oracle database using the above exemplary XML file and column definition identified using Information Server column definition is shown below.

```
LOAD DATA
INFILE <mydatafile>
INTO <mytable>
FIELDS TERMINATED BY ',' OPTIONALLY ENCLOSED BY ""
(
COL1 CHAR NULLIF (COL1 = "NULL"),
COL2 CHAR ,
COL3 CHAR ,
COL4 CHAR
)
```

In another example, a dynamically created control file for a Sybase IQ database using an XML file associated with the Sybase IQ database is shown below. An exemplary XML file associated with Sybase IQ database is shown below. (Sybase and Sybase IQ are trademarks of SAP AG.)

```
<ControlFile>
    <Keyword>load table</Keyword>
    <Option attribute="substitute">ORCH.table></Option>
    <Keyword>(</Keyword>
    <List>
    <Column attribute="describe">
        <Name/>
        <Type>IQOrchMapping</Type>
        <Nullability/>
    </Column>
    </List>
    <Keyword>)</Keyword>
    <Keyword>from '</Keyword>
    <Option attribute="substitute">ORCH.datafile</Option>
    <Keyword>'</Keyword>
    <Keyword>delimited by ','</Keyword>
</ControlFile>
```

The control file created for the Sybase IQ database using the exemplary XML file given above is shown below.

```
LOAD TABLE <mytable>
(
COL1,
COL2,
COL3
)
FROM '<mydatafile>'
DELIMITED BY ','
```

Figure 3:
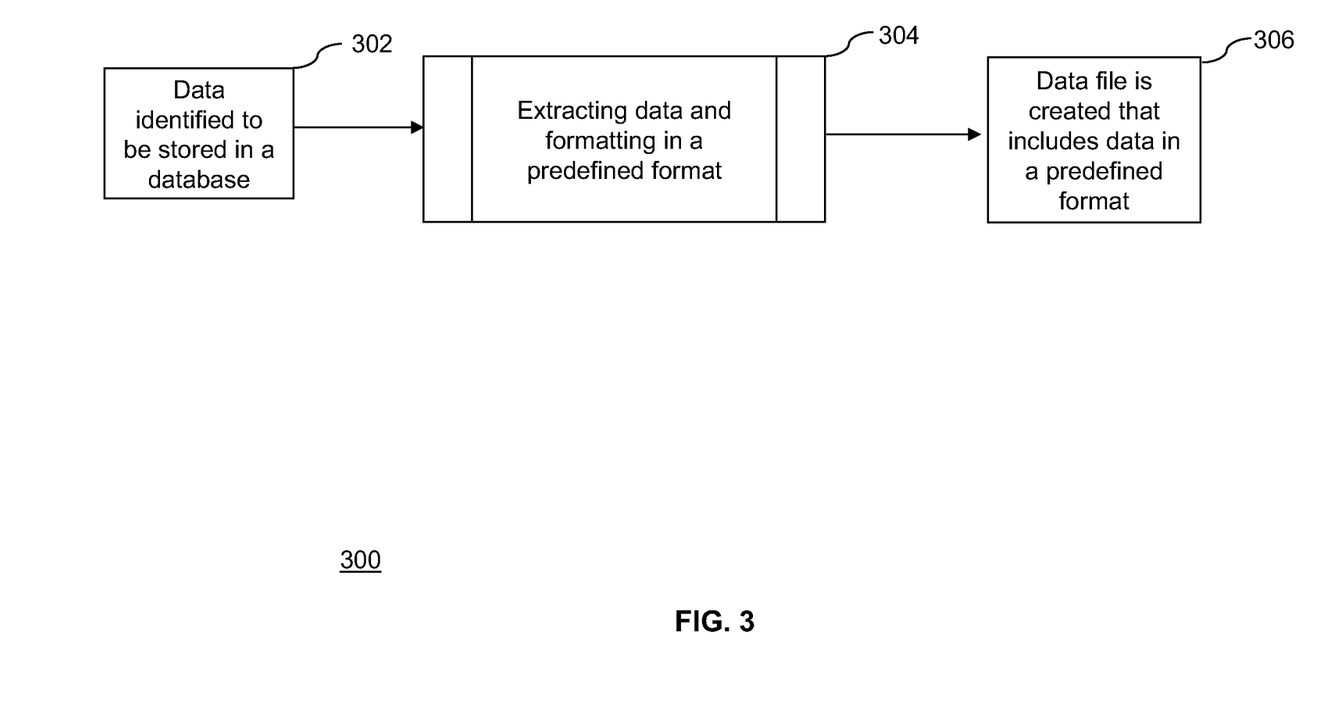
FIG. 3 illustrates a flow diagram to create a data file, in accordance with an embodiment of the invention.

Referring to FIG. 3, a flow diagram 300 for creating a data file is shown. In the flow diagram 300, the data that is to be loaded into a database is formatted in a predefined format. At step 302, data that is to be loaded into the database is identified. In an embodiment, the data that is identified is initially stored in ETL application format. At step 304, the identified data is extracted. Further, the extracted data is formatted in a predefined format. In an embodiment, the predefined format is a delimited data or Comma Separated Version (CSV) data.

In an embodiment, the data that is to be loaded is exported using a program to convert the data from ETL application format to a predefined file format, for example CSV format. The data in a predefined format is loaded in a data file 306. In an example, if a name, identification number, data of birth is stored in ETL application format, then data associated with the name, identification number and data of birth is stored in a data file and is separated with commas, for example a first entry in the data file 306 can be "XYZ, 155667, 1985-12-03 23:00:00"; similarly a second entry can be "ABC, 1556457, 2011-11-03 13:00:00". In an embodiment, the data file is a FIFO file or a flat file. In an embodiment, an Information Server export utility is used to export the data from a source link to the data file in CSV or delimited format.

Figure 4:
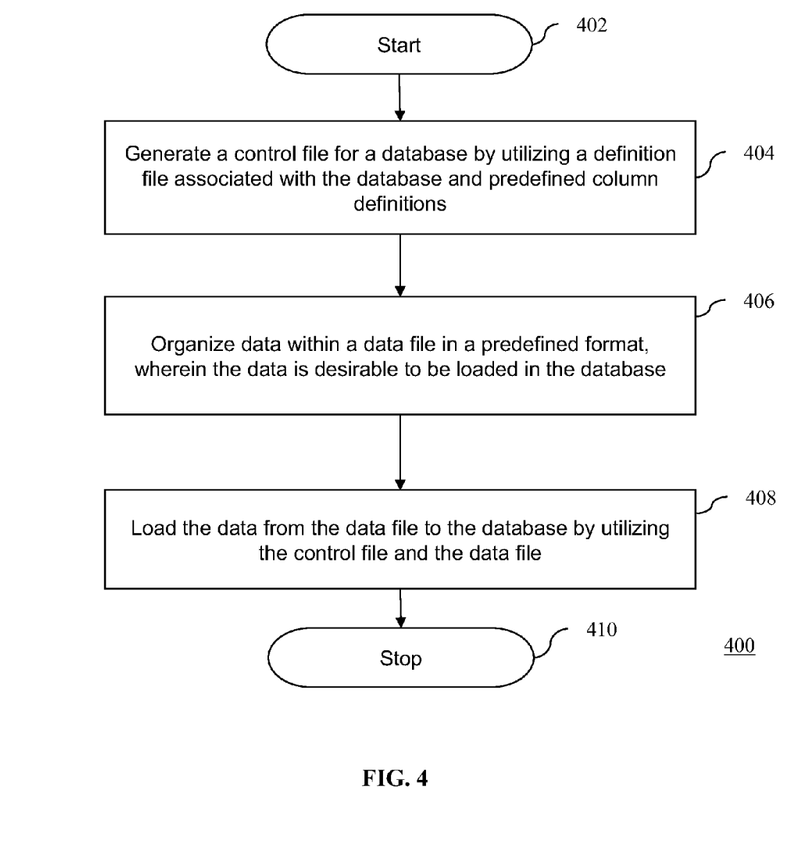
FIG. 4 illustrates a flow chart representing a method to load data in a database, in accordance with an embodiment of the invention.

Referring to FIG. 4, a method 400 for loading data into a database is provided. The method 400 is initiated at step 402. At step 404, a control file is generated for a database utilizing a definition file associated with the database and predefined column definitions. For example, the control file 210 is created according to the database control file syntax using the XML definition file 202 and predefined column definition associated with the Information Server schema definition 208. In an embodiment, the XML definition file 202 is parsed and table fields are substituted to create the control file 210 at runtime. In an embodiment, control files for each database are created in a single software module known as a stage. In an embodiment, the stage launches the database loader utility once the control file is created.

At step 406, data that is desirable to be loaded into the database is organized in a predefined format within a data file 306. In an embodiment, the data is organized in a delimited format or a Comma Separated Version (CSV) format. In an embodiment, the data file is at least one of a FIFO file and a flat file. In an embodiment, the stage uses an Information Server export utility to export the data from a source link to the data file in CSV or delimited format.

At step 408, the data is loaded from the data file to a database, for example database 116, utilizing the control file 210 and the data file 306. In an embodiment, the data is loaded into the database using a database loader. The database loader is provided with a name of a control file, for example the control file 210 and a name of a data file, for example the data file 306 to load the data stored in the data file 306 into the database 116. The database loader then loads the data into the database 116. In an embodiment, exporting of data in data file and loading of data from data file to database happens simultaneously. At step 410, the method 400 is terminated.

Various embodiments of the present invention described above may provide at least, but are not limited to, the following advantages. The present invention provides a method for efficient loading of data in databases. The method uses a single stage for loading data in all databases. The method also creates a control file for each database dynamically. The method can also load the data from the data file to the database simultaneously while the data is being formatted and stored in the data file. The method reduces maintenance time and also reduces time to support new databases.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

As will be appreciated by one skilled in the art, aspects of the present invention may be embodied as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects of the present invention are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A computer implemented method for managing data in a database system, the method comprising:
    dynamically generating, via a processor, a control file for an extract, transform and load (ETL) process for loading data to a database, wherein the ETL process integrates data from a plurality of different data sources and dynamically generating the control file includes:
        parsing a definition file with syntax specific to a database selected from among a plurality of different databases and identifying within the definition file one or more attributes and a column definition syntax for defining one or more columns fix the control file;
        applying predefined column definitions for the database extracted from schema definitions to the column definition syntax identified within the definition file to provide column definitions specific to the database for the control file, wherein the column definitions for the control file specify columns of the database and corresponding types of data for those columns;
        retrieving and applying values for the one or more attributes identified within the definition file to the syntax of the definition file; and
        dynamically generating the control file with the syntax specified in the definition file containing the applied values for the identified one or more attributes and the applied predefined column definitions;
    organizing data within a data file in a predefined format, wherein the data is desirable to be loaded in the database; and
    loading the data from the data file to the database in a single stage by utilizing the dynamically generated control file for the database and the data file.

2. The method of claim 1, wherein the definition file associated with the database comprises an XML configuration file.

3. The method of claim 1, wherein organizing data within the data file comprises arranging the data in the data file in at least one of a delimited format and a Comma Separated Version (CSV) format.

4. The method of claim 1, wherein the data file is at least one of a FIFO file and a flat file.

5. The method of claim 1 further comprising using the predefined column definitions from a graphical user interface of a data integration platform.

6. The method of claim 1, wherein dynamically generating the control file comprises:
    receiving user inputs at runtime; and
    utilizing the user inputs, parsed definition file and the predefined column definitions to create the control file.

7. The method of claim 1, wherein identifying within the definition file a column definition syntax comprises:
    identifying within the definition file a column meta-tag indicating the column definition syntax; and
    wherein applying predefined column definitions for the database comprises:
    replacing the identified column meta-tag, with the predefined column definitions.

8. A computer system for managing data in a database system, the computer system comprising one or more processors including program instructions to:
    dynamically generate a control file for an extract transform and load (ETL) process for loading data to a database, wherein the ETL process integrates data from a plurality of different data sources and dynamically generating the control file includes:
        parsing a definition file with syntax specific to a database selected from among a plurality of different databases and identifying within the definition file one or more attributes and a column definition syntax for defining one or more columns for the control file;
        applying predefined column definitions for the database extracted from schema definitions to the column definition syntax identified within the definition file to provide column definitions specific to the database for the control file, wherein the column definitions for the control file specify columns of the database and corresponding types of data for those columns;
        retrieving and applying, values fir the one or more attributes identified within the definition file to the syntax of the definition file; and
        dynamically generating the control file with the syntax specified in the definition file containing the applied values for the identified one or more attributes and the applied predefined column definitions;
    organize data within a data file in a predefined format, wherein the data is desirable to be loaded in the database; and
    load the data from the data file to the database in a single stage by utilizing the dynamically generated control file for the database and the data file.

9. The computer system of claim 8, wherein the definition file associated with the database comprises an XML format.

10. The computer system of claim 8, wherein the one or more processors include further program instructions to arrange the data within the data file in at least one of a delimited format and a Comma Separated Version (CSV) format.

11. The computer system of claim 8, wherein the data file is at least one of a FIFO file and a flat file.

12. The computer system of claim 8, wherein the one or more processors include further program instructions to use the predefined column definitions from a graphical user interface of a data integration platform.

13. The computer system of claim 8, wherein the one or more processors include further program instructions to:
  receive user inputs at runtime; and
  utilize the user inputs, parsed definition file and the predefined column definitions to create the control.

14. The computer system of claim 8, wherein identifying within the definition file a column definition syntax comprises:
  identifying within the definition file a column meta-tag indicating the column definition syntax; and
  wherein applying predefined column definitions for the database comprises:
  replacing the identified column meta-tag with the predefined column definitions.

15. A computer program product for loading data in databases comprising:
  one or more non-transitory computer-readable storage mediums and program instructions stored on at least one or more of the non-transitory computer-readable storage mediums, the program instructions configured to:
    dynamically generate a control file for an extract, transform and load (ETL) process for loading data to a database, wherein the ETL process integrates data from a plurality of different data sources and dynamically generating the control file includes:
      parsing a definition file with syntax specific to a database selected from among a plurality of different databases and identifying within the definition file one or more attributes and a column definition syntax for defining one or more columns for the control file;
      applying predefined column definitions for the database extracted from schema definitions to the column definition syntax identified within the definition file to provide column definitions specific to the database for the control file, wherein the column definitions for the control file specify columns of the database and corresponding types of data for those columns;
      retrieving and applying values for the one or more attributes identified within the definition file to the syntax of the definition file; and
      dynamically generating the control file with the syntax specified in the definition file containing the applied values for the identified one or more attributes and the applied predefined column definitions;
    organize data within a data file in a predefined format, wherein the data is desirable to be loaded in the database; and
    load the data from the data file to the database in a single stage by utilizing the dynamically generated control file for the database and the data file.

16. The computer program product of claim 15, wherein the definition file associated with the database comprises an XML format.

17. The computer program product of claim 15, further comprising program instructions to arrange the data within the data file in at least one of a delimited format and a Comma Separated Version (CSV) format.

18. The computer program product of claim 15, further comprising program instructions to use the predefined column definitions from a graphical user interface of a data integration platform.

19. The computer program product of claim 15, further comprising program instructions to:
  receive user inputs at runtime; and
  utilize the user inputs, parsed definition file and the predefined column definitions to create the control file.

20. The computer program product of claim 15, wherein identifying within the definition file a column definition syntax comprises:
  identifying within the definition file a column meta-tag indicating the column definition syntax; and
  wherein applying predefined column definitions for the database comprises:
  replacing the identified column meta-tag with the predefined column definitions.

* * * * *